Patented Nov. 9, 1937

2,098,336

UNITED STATES PATENT OFFICE 2,098,336

MANUFACTURE OF CELLULOSE DERIVATIVES AND PRODUCTS OBTAINED THEREFROM

Henry Dreyfus, London, England

No Drawing. Application June 3, 1936, Serial No. 83,271. In Great Britain June 22, 1935

7 Claims. (Cl. 260—101)

This invention relates to improvements in the manufacture of cellulose derivatives and products obtained therefrom, and particularly to improvements in the manufacture of ether-esters of cellulose and of products obtained therefrom.

I have discovered that ether-esters of cellulose having improved properties, particularly improved mechanical properties, may be obtained by esterifying partial ethers of cellulose produced under substantially anhydrous conditions in the presence of an organic base. In this manner cellulose ether-esters may be obtained which are less degraded than the cellulose ether-esters hitherto obtained by the esterification of cellulose ethers prepared in the presence of aqueous caustic alkali and which as stated above have improved properties.

The manufacture of the cellulose ethers by the process described above is described and claimed in my U. S. application S. No. 83,269 filed June 3, 1936, corresponding to British application No. 17980/35 filed 22nd June, 1935, to which reference is made in this connection. As described therein, etherification may be effected with any suitable etherifying agent, for example ethyl chloride, dimethyl sulphate or benzyl chloride, in the presence for example of a lower alkylamine, pyridine, or piperidine. Preferably etherification is effected in the presence of a substantially water-insoluble organic diluent, for example a hydrocarbon or an ether.

As stated above the cellulose ether-esters of the present invention are obtained by the esterification of a partial ether of cellulose and preferably the ethers contain only a relatively small proportion of ether groups, for example ¼ to ½ up to about 1 ether group per $C_6H_{10}O_5$ molecule. By varying the relative proportions of ether and ester groups and the types of ether and ester groups the solubility properties of the products may be varied. For example, products which contain relatively small proportions of ethyl or other lower alkyl groups and high proportions of acetate groups have solubility properties resembling those of cellulose acetate itself, while products containing high proportions of ether groups, particularly ether groups derived from higher aliphatic alcohols or aromatic alcohols, for example benzyl alcohol, or containing higher fatty acid radicles or aromatic acid radicles, for example the radicles of stearic acid or benzoic acid, are in general soluble in a hydrocarbon type of solvent, for example benzene.

Esterification according to the process of the present invention may be carried out either in the presence of a solvent for the cellulose ether-ester produced so that the ether-ester is obtained in solution or in the presence of a non-solvent so that the product is obtained in suspension. Fabrics and other materials which have been etherified under such conditions that their structure is retained may also be esterified so that products which retain the original structure of the cellulosic material are produced. For this purpose catalysts which do not tend to combine with or hydrolyze the cellulosic materials, for example sodium and potassium acetates, zinc chloride, stannic chloride, ferric chloride and other metallic chlorides, with or without hydrochloric acid, are particularly valuable.

Preferably the esterifying agent employed is an acid anhydride, for example acetic anhydride, propionic anhydride, or benzoic anhydride, although other esterifying agents may also be used, for example acid halides and esters, e. g. methyl and ethyl acetates. Acid halides are preferably employed in the presence of an organic base e. g. pyridine or piperidine and esterification by this method may be carried out continuously with the etherification using the same organic base for both processes, the acid halide being introduced when etherification is finished, or esterification and etherification may be carried out simultaneously in a medium containing the organic base and suitable etherifying and esterifying agents.

The most suitable catalyst for use in an esterification process employing an acid anhydride as esterifying agent is sulphuric acid, which may be employed for example in a proportion of about 6 to 8 or 10% of the weight of the cellulose ether when esterification is effected at temperatures of the order of 20–30° C. If higher temperatures are employed preferably the proportion of sulphuric acid is lower, e. g. 2–4%. Other esterification catalysts which may be employed are mixtures of metallic halides and hydrohalide acids, e. g. ferric, stannic or zinc chloride and hydrochloric acid, perchloric acid or a mixture of sodium perchlorate or other perchlorate with perchloric acid or other suitable acid, sulphuryl chloride, mixtures of phosphoric acid and sulphuric acid, and sulphonic acids, e. g. benzene sulphonic acid. Esterification processes employing metallic halides with or without hydrohalide acids are described in U. S. Patents Nos. 1,936,586, 1,950,663, and 1,911,069, U. S. applications S. Nos. 301,928 and 301,929 both filed 24th August 1928, and British Patent No. 309,201, to which reference is made in this connection. Cellulose ether-esters of high viscosity may be obtained by having present during esterification large proportions of suitable solvents or diluents, for example 600 or 800% or more of the weight of the cellulose ether, as described in U. S. Patent No. 1,708,787.

The primary cellulose ether-esters obtained according to the present invention may be employed as such for the manufacture of artificial filaments, films and other products or they may be subjected to ripening processes in order to split off ester groups. Such processes are particularly desirable when sulphuric acid and other catalysts which tend to combine with cellulose have been employed. Ripening may be carried out in the esterification solution or suspension or the cellulose ether-ester, after separation from the esterification medium, may be dissolved or suspended in a suitable medium for the ripening operation. Particularly valuable results may be obtained in the case of cellulose ether-esters produced in the presence of sulphuric acid or other polybasic acid as catalyst by substantially completely neutralizing the catalyst, destroying any excess of esterifying agent and allowing the mixture to stand for some time and then adding a quantity of ripening agent, for example water, and completing the ripening operation.

*Example 1*

100 parts of an ethyl cellulose produced under substantially anhydrous conditions in the presence of an organic base and having a content of about .8 ethyl radicle per $C_6H_{10}O_5$ molecule is esterified in an esterifying medium consisting of about 300 parts of acetic anhydride, 300 parts of glacial acetic acid and 8 parts of sulphuric acid, the temperature being controlled so that it does not rise above 30° C. When esterification is complete an acetic acid solution of sodium acetate is stirred into the acetylation mixture in an amount sufficient to neutralize about 80% of the sulphuric acid and the mixture is then allowed to stand for 6–8 hours. At the expiration of this time water is stirred in, the amount employed being sufficient to destroy the excess acetic anhydride and to provide an excess of about 20 parts, and ripening is allowed to continue until an ethyl cellulose acetate having the desired acetyl content is obtained. The cellulose ether-ester is then precipitated by mixing the solution with a large excess of water after which it is separated, washed and dried.

*Example 2*

100 parts of an ethyl cellulose containing about one ether group per $C_6H_{10}O_5$ obtained, for example, as described in Example 2 of U. S. application S. No. 83,269 filed June 3, 1936, corresponding to British application No. 17,980/35 filed 22nd June, 1935, is acetylated in an acetylating medium consisting of about 250 parts of acetic anhydride, 300 parts of glacial acetic acid, 5 parts of ferric chloride and 5 parts of hydrochloric acid, the temperature being kept below 30° C. On completion of esterification water is added in a quantity sufficient to provide an excess of about 20 parts after decomposition of the excess acetic anhydride and the ethyl cellulose acetate is allowed to ripen until the desired product is obtained after which it is precipitated, separated and washed as described in the preceding example.

The cellulose ether-esters obtained according to the present invention may be employed for the manufacture of artificial filaments, films, lacquers or other articles. Thus, a cellulose ether-ester may be dissolved in a suitable solvent and extruded through suitable orifices into an evaporative atmosphere or into a liquid coagulating medium in order to obtain artificial filaments, foils or similar products. When aqueous coagulating media are employed it is desirable that they should contain relatively high proportions of solvents or swelling agents for the cellulose ether-ester, as described, for example in U. S. applications S. Nos. 402,785 filed 26th October 1929 and 418,414 filed 3rd January 1930, or alternatively the products may be treated after coagulation with media containing high concentrations of such agents. By subjecting the artificial products to stretching operations with the aid of such liquid media, as described in the above applications, products having a high tenacity may be obtained.

Artificial filaments, films and similar products having a basis of the cellulose ether-esters of the present invention may be subjected to any suitable after-treatment processes. For example, they may be treated with methylene chloride or other latent solvents or other shrinking agents in order to improve their extensibility, or for the production of effects, as described in U. S. applications S. Nos. 607,667 filed 16th April, 1932, 611,240 filed 13th May 1932, and U. S. Patent No. 2,020,303, or they may be stretched with the aid of suitable swelling agents, as described in U. S. applications S. Nos. 378,684 filed 16th July 1929, 573,424 filed 6th November 1931 and 755,420 filed 30th November 1934, or in the presence of steam or hot water, as described in U. S. applications Nos. 4,510 and 4,511 both filed 1st February 1935.

Stretching or other processes carried out in the presence of steam or other agents under pressure may be effected by means of the processes and apparatus described in U. S. application S. No. 17,242 filed 19th April 1935.

Artificial products having a basis of the cellulose ether-esters of the present invention may also be subjected to saponification processes, e. g. to raise their safe ironing point and to impart an affinity for cotton colours.

Saponification may be effected by means of caustic soda, sodium silicate, or other inorganic base, as described for example in U. S. Patents Nos. 1,884,620, 1,884,621, 1,884,622, and 1,844,623, and in U. S. applications S. Nos. 655,773 and 655,778 both filed 8th February 1933, or by means of an organic base, e. g. a methylamine or ethylene diamine, as is described in U. S. applications S. Nos. 752,376 filed 9th November 1934, 756,285, 756,282, 756,284 all filed 6th December 1934, 329 and 326 both filed 4th January 1935. The use of organic bases is particularly valuable when it is desired to effect a deep-seated saponification which is substantially uniform throughout the cross-section of the materials. Other processes yielding this type of saponification are those employing sodium silicate and also saponification in the presence of gelatine and the like, as is described in U. S. application S. No. 743,712 filed 12th September 1934. Saponification and stretching may be carried out simultaneously as described in U. S. application S. No. 756,283 filed 6th December 1934.

By saponification of the products of the present invention products having a high tenacity and an affinity for cotton colours may be obtained, with a lower loss in weight and reduction of denier than when products containing only ester groups are saponified.

Having described my invention, what I desire to secure by Letters Patent is:—

1. Process for the production of ether-esters of cellulose, comprising esterifying partial ethers of cellulose which have been produced under substantially anhydrous conditions and in the presence of an organic base.

2. Process for the production of ether-esters of cellulose, comprising esterifying partial alkyl ethers of cellulose which have been produced under substantially anhydrous conditions and in the presence of an organic base.

3. Process for the production of ether-esters of cellulose, comprising partially etherifying cellulosic materials under substantially anhydrous conditions and in the presence of an organic base, and then esterifying the partial ethers of cellulose obtained.

4. Process for the production of ether-esters of cellulose, comprising introducing hydrocarbon ether radicles into cellulosic materials by treating them with suitable etherifying agents under substantially anhydrous conditions and in the presence of an organic base, and then esterifying the partial ethers of cellulose obtained.

5. Process for the production of ether-esters of cellulose, comprising esterifying cellulose ethers containing not more than one alkyl radicle per $C_6H_{10}O_5$ molecule which have been produced under substantially anhydrous conditions and in the presence of an organic base.

6. Process for the production of ether-esters of cellulose, comprising esterifying at a temperature below 30° C. partial alkyl ethers of cellulose which have been produced under substantially anhydrous conditions and in the presence of an organic base.

7. Process for the production of ether-esters of cellulose, comprising esterifying in the presence of sulphuric acid as catalyst partial alkyl ethers of cellulose which have been produced under substantially anhydrous conditions and in the presence of an organic base.

HENRY DREYFUS.